(12) United States Patent
Eberl et al.

(10) Patent No.: US 11,156,547 B2
(45) Date of Patent: Oct. 26, 2021

(54) PHOTOACOUSTIC GAS SENSORS AND METHOD OF OPERATING A PHOTOACOUSTIC GAS SENSOR

(71) Applicant: Infineon Technologies AG, Neubiberg (DE)

(72) Inventors: Matthias Eberl, Taufkirchen (DE); Franz Jost, Stuttgart (DE); Ilie Poenaru, Goeggenhofen/Aying (DE)

(73) Assignee: Infineon Technologies AG, Neubiberg (DE)

( * ) Notice: Subject to any disclaimer, the term of this patent is extended or adjusted under 35 U.S.C. 154(b) by 256 days.

(21) Appl. No.: 16/380,376

(22) Filed: Apr. 10, 2019

(65) Prior Publication Data

US 2019/0339193 A1    Nov. 7, 2019

(30) Foreign Application Priority Data

May 4, 2018   (DE) .......................... 102018110689.0

(51) Int. Cl.
*G01N 21/17*   (2006.01)
*G01N 29/24*   (2006.01)

(52) U.S. Cl.
CPC ..... *G01N 21/1702* (2013.01); *G01N 29/2418* (2013.01); *G01N 2021/1704* (2013.01); *G01N 2291/021* (2013.01)

(58) Field of Classification Search
CPC .............. G01N 21/1702; G01N 21/37; G01N 21/3504; G01N 29/2418; G01N 29/30; G01N 29/2425; G01N 29/14; G01N 29/4463; G01N 2291/021; H04R 1/083

USPC ........................................................ 73/24.02
See application file for complete search history.

(56) References Cited

U.S. PATENT DOCUMENTS

| | | |
|---|---|---|
| 4,818,882 A | 4/1989 | Nexo et al. |
| 6,006,585 A | 12/1999 | Forster |
| 7,242,479 B2 | 7/2007 | Moeckli et al. |
| 2006/0199260 A1* | 9/2006 | Zhang ............... B01L 3/502723 435/293.1 |

(Continued)

FOREIGN PATENT DOCUMENTS

| | | |
|---|---|---|
| CN | 101334356 A | 12/2008 |
| CN | 104568757 A | 4/2015 |

(Continued)

*Primary Examiner* — Tarun Sinha
(74) *Attorney, Agent, or Firm* — Harrity & Harrity, LLP (57) ABSTRACT

A photoacoustic gas sensor is provided. The photoacoustic gas sensor includes a hermetically sealed housing filled with a reference gas. Further, the photoacoustic gas sensor includes a microphone system arranged inside the housing. The microphone system is configured to generate a first microphone signal comprising a first signal component related to a photoacoustic excitation of the reference gas and a second microphone signal comprising a second signal component related to the photoacoustic excitation. The photoacoustic gas sensor additionally includes a circuit configured to generate an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

20 Claims, 6 Drawing Sheets

(56) References Cited

U.S. PATENT DOCUMENTS

| | | |
|---|---|---|
| 2006/0254340 A1 | 11/2006 | Baraket et al. |
| 2008/0252891 A1 | 10/2008 | Uber |
| 2012/0247183 A1 | 10/2012 | Rezachek |
| 2017/0212036 A1 | 7/2017 | Mueller et al. |
| 2017/0350810 A1 | 12/2017 | Tumpold et al. |
| 2019/0257796 A1* | 8/2019 | Duraffourg ........ G01N 29/2425 |
| 2020/0080972 A1 | 3/2020 | Dehe et al. |

FOREIGN PATENT DOCUMENTS

| | | |
|---|---|---|
| DE | 3716763 A1 | 12/1987 |
| DE | 102016205024 A1 | 9/2016 |
| EP | 2604998 A1 | 6/2013 |
| WO | 2017055219 A1 | 4/2017 |

\* cited by examiner

PHOTOACOUSTIC GAS SENSORS AND METHOD OF OPERATING A PHOTOACOUSTIC GAS SENSOR

RELATED APPLICATION

This application claims priority under 35 U.S.C. § 119 to German Patent Application No. 102018110689.0, filed on May 4, 2018, the contents of which are incorporated by reference herein in their entirety.

FIELD

Examples relate to photoacoustic gas sensors and a method of operating a photoacoustic gas sensor.

BACKGROUND

Photoacoustic measurement systems use a modulated light source for emitting infrared light towards a measuring path filled with gas. The light is partly absorbed by the gas and the remaining light enters a measuring cell. The remaining light is absorbed by a reference gas inside the measuring cell causing the reference gas to heat up and expand. The thus generated pressure difference is measured by means of a microphone arranged inside the measuring cell. However, conventional photoacoustic measurement systems are susceptible to background perturbations like vibrations or noise, which negatively affect the measurement.

SUMMARY

Hence, there may be a demand for a photoacoustic measurement system exhibiting reduced susceptibility to background perturbations.

The demand may be satisfied by the subject matter of the appended claims.

An example relates to a photoacoustic gas sensor. The photoacoustic gas sensor comprises a hermetically sealed housing filled with a reference gas. Further, the photoacoustic gas sensor comprises a microphone system arranged inside the housing. The microphone system is configured to generate a first microphone signal comprising a first signal component related to a photoacoustic excitation of the reference gas and a second microphone signal comprising a second signal component related to the photoacoustic excitation. The photoacoustic gas sensor additionally comprises a circuit configured to generate an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

An example relates to another photoacoustic gas sensor. The photoacoustic gas sensor comprises a hermetically sealed housing filled with a reference gas. Further, the photoacoustic gas sensor comprises a first membrane arranged inside the housing and a second membrane arranged inside the housing. The first membrane comprises a first main surface configured to receive sound waves from the reference gas and a second main surface opposite to the first main surface. The second membrane comprises a third main surface configured to receive sound waves from the reference gas and a fourth main surface opposite to the third main surface. The first membrane and the second membrane are oriented such that a first direction pointing from the first main surface to the second main surface is opposite to a second direction pointing from the third main surface to the fourth main surface.

A further example relates to a method of operating a photoacoustic gas sensor comprising a microphone system arranged inside a hermetically sealed housing. The housing is filled with a reference gas. The method comprises generating a first microphone signal using the microphone system. The first microphone signal comprises a first signal component related to a photoacoustic excitation of the reference gas. Further, the method comprises generating a second microphone signal using the microphone system. The second microphone signal comprises a second signal component related to the photoacoustic excitation. Additionally, the method comprises generating an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
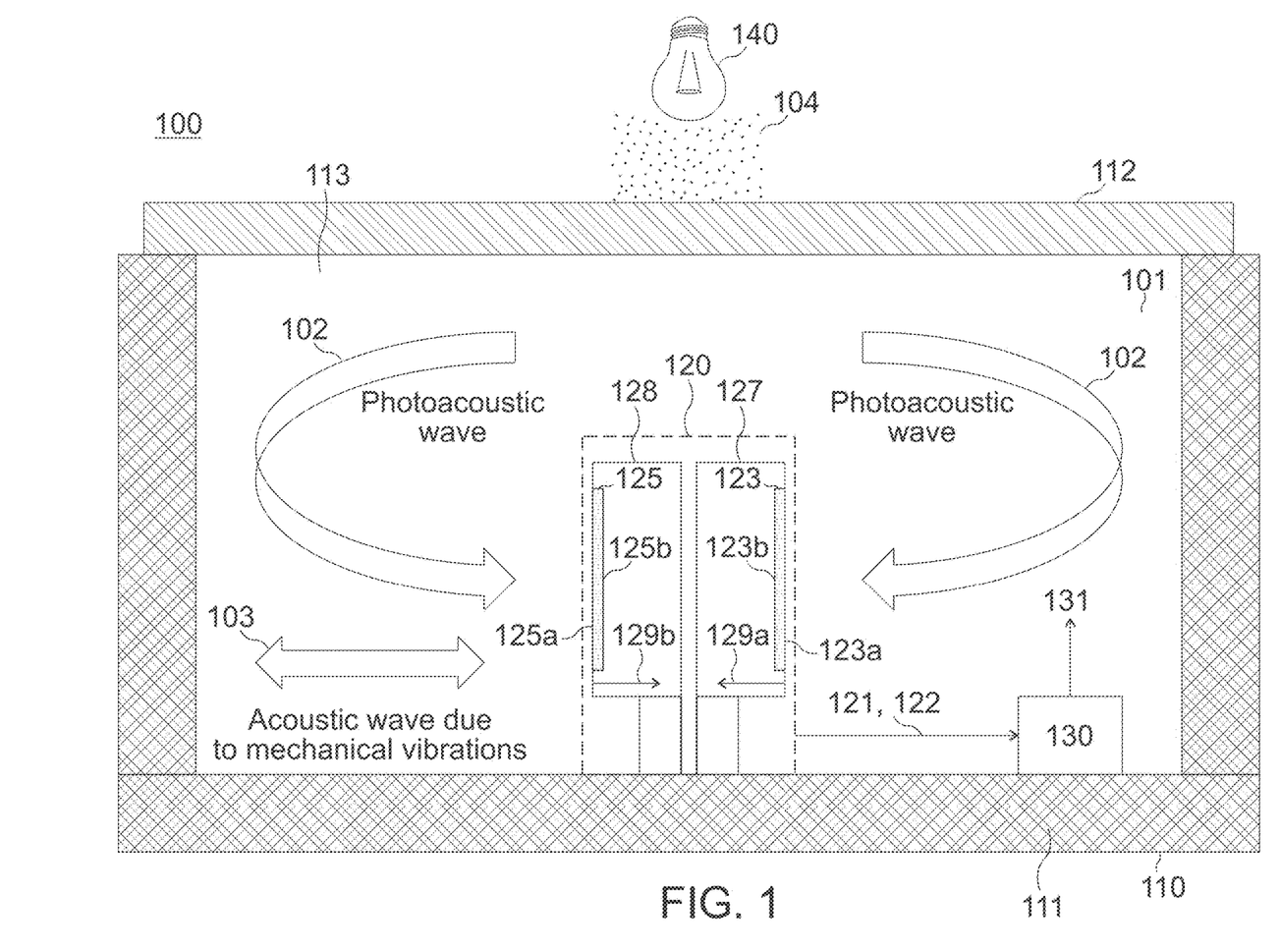
FIG. 1 illustrates a first example of a photoacoustic gas sensor.

FIG. 1 illustrates a photoacoustic gas sensor 100. The photoacoustic gas sensor 100 comprises a hermetically sealed housing 110. The housing 110 comprises a housing body 111 and a housing lid 112. The housing lid 112 closes a cavity 113 formed in the housing body 111. The housing 110 may be made up of many different materials. For example, the housing body 111 may be made of ceramics or metal. The housing lid 112 may, e.g., be made of ceramics, metal, semiconductor material (e.g. silicon), sapphire or glass. For example, the housing lid 112 may be an infrared window or exhibit bandpass characteristic. The housing 110 is hermetically sealed, e.g. the housing lid 112 is attached such to the housing body 111 that substantially no gas exchange between the cavity 113 and the gas atmosphere surrounding the housing 110 occurs. It is to be noted that due to common process fluctuations or process tolerances, affixing the housing lid 112 to the housing body 111 in a perfectly gas tight manner is not always possible. Accordingly, the term "hermetically sealed" as used within the present application also covers affixations of the housing lid 112 to the housing body 111 that allow a certain (very low) leakage into the cavity 113 or out of the cavity 113. For example, housing lid 112 may be affixed to housing body 111 by welding (e.g. seam welding, resistance welding or laser welding), soldering (with or without using preforms) or glass frit bonding.

The housing is filled with a reference gas 101. The reference gas 101 is configured to at least partially absorb light of one or more predefined wavelengths. In other words, the light interacts with the reference gas and releases at least part of its energy to the reference gas 101. The reference gas 101 may, e.g., be $CO_2$, CO, $H_2O$, $CH_4$, $O_3$, $NH_4$, $NO_x$ or $N_2O$. However, also any other gas capable of absorbing photons of one or more predefined wavelengths may be used. The light entering the cavity 113 via the housing lid 112 is at least partly absorbed by the reference gas 101 at the one or more predefined wavelengths so that the reference gas 101 heats up and expands. Heating up the reference gas 101 in the cavity 113 of constant volume causes a pressure change within the cavity 113, which is perceptible as a photoacoustic wave 102. In other words, the reference gas 101 is photoacoustically excited.

The photoacoustic wave 102 (pressure change) is measured by a microphone system 120 arranged inside the housing 110. The microphone system 120 is configured to generate a first microphone signal 121 comprising a first signal component related to the photoacoustic excitation of the reference gas 101 and a second microphone signal 122 comprising a second signal component related to the photoacoustic excitation of the reference gas 101.

The microphone system 120 is configured to generate the first microphone signal 121 based on a relative movement of a first membrane 123 with respect to a first backplate. Further, the microphone system 120 is configured to generate the second microphone signal 122 based on a relative movement of a second membrane 125 with respect to a second backplate. As indicated in FIG. 1, the microphone system 120 may, e.g., comprise a first microphone 127 comprising the first membrane 123 and a second microphone 128 comprising the second membrane 125. Although not illustrated, the microphone system 120 may alternatively be a (single) microphone implemented in one semiconductor piece (e.g. one semiconductor die) so that the microphone comprises the first membrane and the second membrane. For example, the microphone system 120 may be implemented as MEMS (MicroElectroMechanicalSystem). The microphone system 120 may, e.g., be read out electronically or optically. If read out electronically, the first microphone signal 121 may, for example, be based on a capacity change between the first membrane 123 and the first backplate due to the relative movement of the first membrane 123. When optically read out, the first microphone signal 121 may, e.g., be based on an intensity change of a light beam deflected from the first membrane 123.

The first membrane 123 comprises a first main surface 123a configured to receive sound waves from the reference gas 101 (e.g. photoacoustic wave 102 or acoustic wave 103) and a second main surface 123b opposite to the first main surface 123a. The second main surface 123b is not subjected to the reference gas 101. Thus, the photoacoustic wave 102 and acoustic wave 103 from the reference gas 101 are received and transferred to the first membrane 123 only via first main surface 123a. The second membrane 125 comprises a third main surface 125a configured to receive sound waves from the reference gas 101 (e.g. photoacoustic wave 102 or acoustic wave 103) and a fourth main surface 125b opposite to the third main surface 125a. The fourth main surface 125b is not subjected to the reference gas 101. Thus, the photoacoustic wave 102 and acoustic wave 103 from the reference gas 101 are received and transferred to the second membrane 125 only via third main surface 125a. The first membrane 123 and the second membrane 125 are oriented such that a first direction 129a pointing from the first main surface 123a to the second main surface 123b is opposite to a second direction 129b pointing from the third main surface 125a to the fourth main surface 125b.

Since the photoacoustic excitation of the reference gas 101 is caused by only the light entering the housing 110, the first microphone signal 121 and the second microphone signal 122 both indicate the amount of energy transferred from the light to the reference gas 101. However, background perturbations like vibrations or noise may affect the measurement. For example, vibrations of a device the photoacoustic gas sensor 100 is mounted to (e.g. a vehicle) or strong background noise may cause mechanical vibrations of the photoacoustic gas sensor 100. The mechanical vibrations of the photoacoustic gas sensor 100 cause one or more additional acoustic waves 103 within the housing 110. Also, the at least one additional acoustic wave 103 is sensed by the membranes of the microphone system 120. As a consequence, the first microphone signal 121 and the second microphone signal 122 comprise not only the desired first and second signal components related to the photoacoustic excitation of the reference gas 101 but undesired additional signal components related to the mechanical vibrations of the photoacoustic gas sensor 100. For example, the first microphone signal 121 may comprise a third signal component related to the mechanical vibrations of the photoacoustic gas sensor 100 and the second microphone signal 122 may comprise a fourth signal component related to the mechanical vibrations of the photoacoustic gas sensor 100.

The photoacoustic gas sensor 100 additionally comprises a circuit 130 configured to generate an output signal 131 based on the first microphone signal 121 and the second microphone signal 122 by destructively superimposing the third signal component of the first microphone signal 121 and the fourth signal component of the second microphone signal 122. In some implementations, the third signal component of the first microphone signal 121 and the fourth signal component of the second microphone signal 122 are combined such by the circuit 130 that signal components related to the mechanical vibrations of the photoacoustic gas sensor 100 are at least reduced in the resulting combined output signal 131 compared to each of the first microphone signal 121 and the second microphone signal 122. In other words, the circuit 130 combines the first microphone signal 121 and the second microphone signal 122 such that the third signal component of the first microphone signal 121 at least partly compensates the negative effects of the fourth signal component of the second microphone signal 122, or vice versa. In some examples, destructively superimposing the third signal component of the first microphone signal 121 and the fourth signal component of the second microphone signal 122 may allow to generate the output signal 131 with a compensated mechanical vibration component, e.g. substantially without any signal components related to the mechanical vibrations of the photoacoustic gas sensor 100.

Figure 2A:
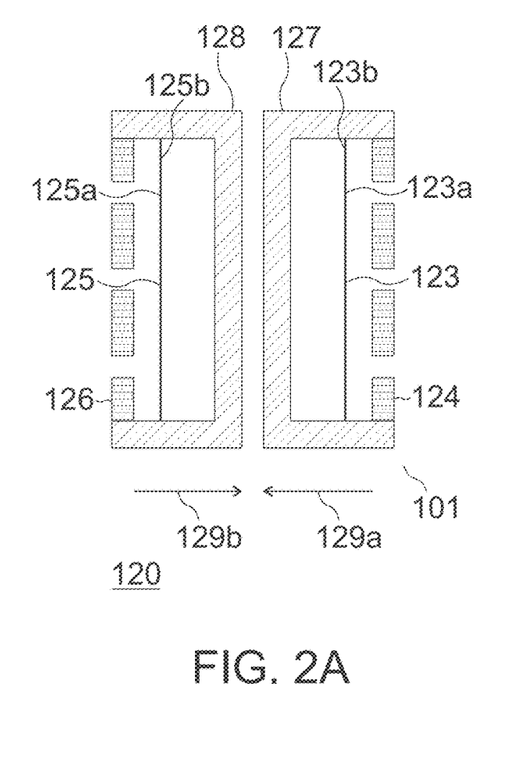
FIGS. 2A-F illustrate a microphone system in various situations.
Figure 2B:
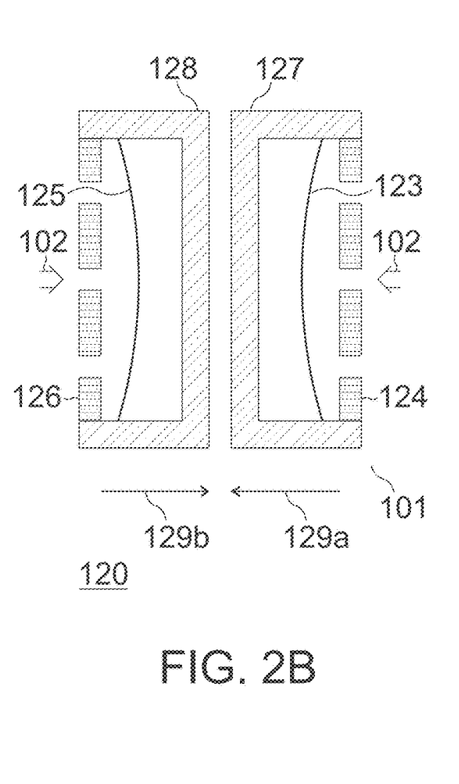
Figure 2C:
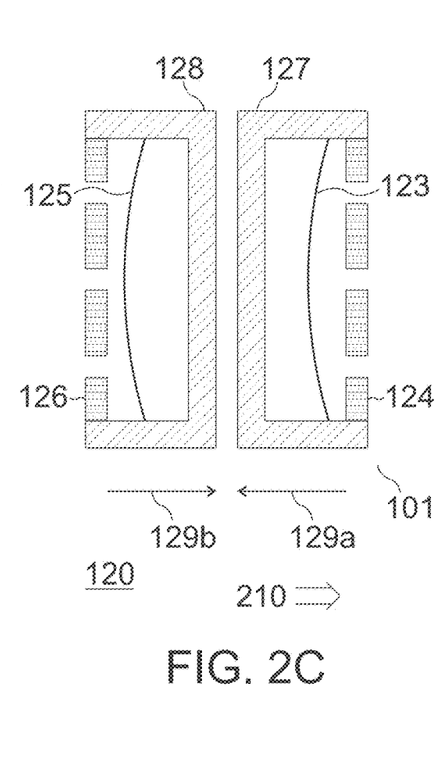

To further explain the above described vibration compensation, FIGS. 2A to 2C depict the microphone system 120 in different situations.

FIG. 2A illustrates the microphone system 120 in a rest (neutral) position. The first microphone 127 comprises the first membrane 123 and the first backplate 124, and the second microphone 128 comprises the second membrane 125 and the second backplate 126. The first membrane 123 and the second membrane 125 face each other, so that the first direction 129a pointing from the first main surface 123a to the second main surface 123b of the first membrane 123 is opposite to the second direction 129b pointing from the third main surface 125a to the fourth main surface 125b of the second membrane 125. In the implementation of FIGS. 2A-2C, the first and second membranes 123 and 125 are oriented such that the second main surface 123b and the fourth main surface 125b face each other while the first main surface 123a and the third main surface 125a are turned away from each other.

In an alternative implementation, each of the microphone membranes 123 and 125 may be flipped around such that the first main surface 123a and the third main surface 125a face each other while the second main surface 123b and the fourth main surface 125b are turned away from each other. The first backplate 124 and the second backplate 126 may then face each other.

FIG. 2B illustrates the microphone system 120 while the surrounding reference gas 101 is photoacoustically excited, e.g. while a photoacoustic wave 102 propagates inside the cavity 113 of housing 110. In the situation illustrated in FIG. 2B, the photoacoustic gas sensor is not mechanically vibrating. Due to the arrangement of the membranes 123 and 125 with respect to the backplates 124 and 126, both membranes perform (substantially) the same relative movement with respect to the respective backplate. As illustrated in FIG. 2B, the first membrane 123 moves away from the first backplate 124 and at the same time the second membrane 125 moves away the second backplate 126. In other words, the first membrane 123 and the second membrane 125 move in opposite (reverse) directions in response to the photoacoustic excitation of the reference gas 101.

FIG. 2C illustrates the microphone system 120 during mechanical vibrations of the photoacoustic gas sensor 100. In the situation illustrated in FIG. 2C, the reference gas 101 is not photoacoustically excited. The mechanical vibrations of the photoacoustic gas sensor 100 can be understood as mechanical shocks acting on the microphone system 120. Due to the inertias of the first and second membranes 123 and 125 as well as the inertia of the surrounding reference gas 101, the mechanical vibrations of the photoacoustic gas sensor 100 cause a movement of the remaining parts of the microphones 127 and 128 rather than a movement of the first and second membranes 123 and 125.

FIG. 2C illustrates a vibration movement 210 of the photoacoustic gas sensor 100 from the left side to the right side, e.g. a shock propagating from the left side to the right side. Since the microphone system 120 is affixed to the housing 110 of the photoacoustic gas sensor 100, the remaining part of both microphones 127 and 128 move from the left side to the right side, whereas the first and second membranes 123 and 125 substantially remain at their positions due to their inertias and the inertia of the surrounding reference gas 101. Due to the arrangement of the membranes 123 and 125 with respect to the backplates 124 and 126, both membranes perform substantially opposite (reverse) relative movements with respect to the respective backplate. As illustrated in FIG. 2C, the first membrane 123 moves away from the first backplate 124 and at the same time the second membrane 125 moves towards (approaches) the second backplate 126. In other words, the first membrane 123 and the second membrane 125 move in the same direction in response to the mechanical vibrations of the photoacoustic gas sensor 100.

Therefore, the mechanical vibrations of the photoacoustic gas sensor 100 result in opposite signal polarities of the third signal component of the first microphone signal 121 and the fourth signal component of the second microphone signal 122. I is, while one of the third signal component and the fourth signal component adds to the remaining signal components of its microphone signal, the other one of the third signal component and the fourth signal component subtracts from the remaining signal components of its microphone signal. For example, while the third signal component of the first microphone signal 121 exhibits a positive slope the fourth signal component of the second microphone signal 122 exhibits a negative slope, and vice versa.

Referring back to FIG. 1, if the reference gas 101 is photoacoustically excited and at the same time the photoacoustic gas sensor 100 is mechanically vibrating, the microphone signals 121 and 122 generated by the microphone system may be described as follows:

$$Mic_1 = \alpha_1 + \alpha_3 \quad (1)$$

$$Mic_2 = \alpha_2 - \alpha_4 \quad (2)$$

$Mic_1$ denotes the first microphone signal 121, $Mic_2$ denotes the second microphone signal 122, $\alpha_1$ denotes the first signal component of the first microphone signal 121, $\alpha_3$ denotes the third signal component of the first microphone signal 121, $\alpha_2$ denotes the second signal component of the second microphone signal 122 and $\alpha_4$ denotes the fourth signal component of the second microphone signal 122.

The output signal 131 generated by circuit 130 based on the microphone signals 121 and 122 may be described as follows:

$$Out = \alpha_1 + \alpha_2 + (\alpha_3 - \alpha_4) \quad (3)$$

Out denotes the output signal 131.

It can be seen from expression (3) that the desired first signal component of the first microphone signal 121 and the desired second signal component of the second microphone signal 122 add up, whereas the undesired third signal component of the first microphone signal 121 and the undesired fourth signal component of the second microphone signal 122 mitigate each other. In other words, the circuit 130 is configured to generate the output signal 131 by constructively superimposing the first signal component and the second signal component and by destructively superimposing the third signal component and the fourth signal component. Accordingly, a Signal-to-Noise Ratio (SNR) of the output signal 131 may be increased compared to the microphone signals 121 and 122.

Assuming that the absolute values of the first signal component of the first microphone signal 121 and the second signal component of the second microphone signal 122 are identical and that the absolute values of third signal component of the first microphone signal 121 and the fourth signal component of the second microphone signal 122 are identical, expression (3) may be rewritten as:

$$Out = 2 \cdot \alpha_1 = 2 \cdot \alpha_2 \quad (4)$$

In some implementations, circuit 130 may generate the output signal 131 substantially without any signal components related to the mechanical vibrations of the photoacoustic gas sensor 100. For example, if both microphones 127 and 128 exhibit the same acoustic performance, the signal components related to the mechanical vibrations of the photoacoustic gas sensor 100 may be cancelled out by the circuit 130.

Based on the output signal 131, the concentration of a gas 104 to be evaluated may be determined. The gas 104 is arranged between a light source 140 and the housing 110. The light source 140 emits light towards the gas 104. The proportion of the light that is not absorbed by gas 104 enters the housing via housing lid 112 and photoacoustically excites the reference gas 101. As described above, the microphone signals 121 and 122 are both indicative of the amount of energy transferred from the light to the reference gas 101. Accordingly, also the output signal 131 is indicative of the energy transferred from the light to the reference gas 101. However, the SNR of the output signal 131 is increased compared to the microphone signals 121 and 122. Taking into account the known parameters of the light emission by light source 140, the concentration of the gas 104 may be determined based on the output signal 131 according to known (calculation) methods.

The proposed architecture may, hence, allow to provide a vibration-compensated photoacoustic gas sensor.

The microphones/membranes may be arranged closely together in order to achieve a high level of miniaturization and to enable measurement of acoustic waves at substantially the same location. To achieve this, according to some implementations, a distance between the first membrane 123 and the second membrane 125 may be less than two times a maximum diameter of one of the first membrane 123 and the second membrane 125.

Figure 2D:
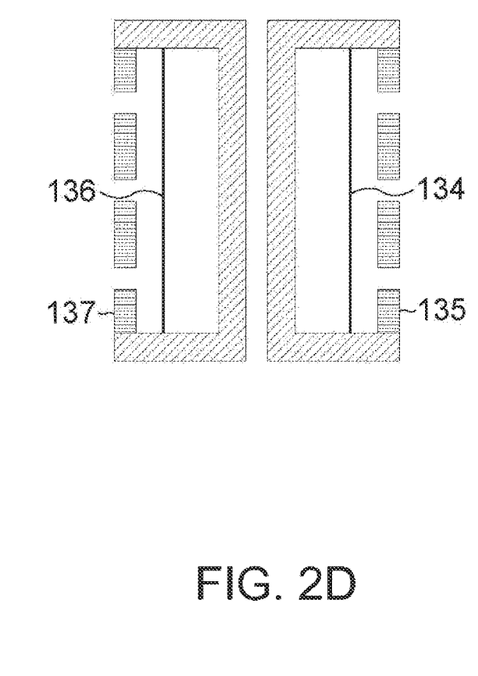
Figure 2E:
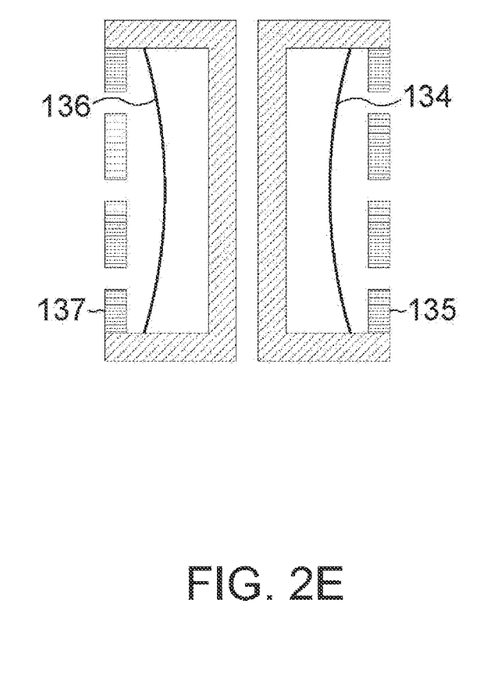
Figure 2F:
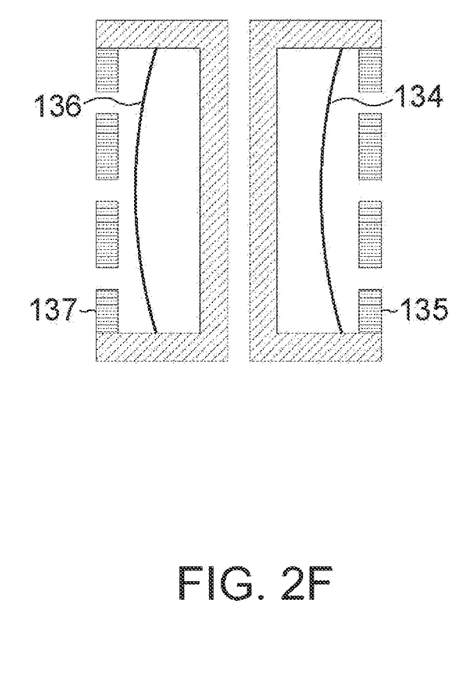

The microphone system 120 may optionally comprise additional pairs of membranes. For examples, as illustrated in FIGS. 2D-2F, the microphone system 120 may be configured to generate a third microphone signal based on a relative movement of a third membrane 134 with respect to a third backplate 135, and to generate a fourth microphone signal based on a relative movement of a fourth membrane 136 with respect to a fourth backplate (not illustrated). The first to fourth membranes are oriented such that a first virtual straight line connecting the centers of the first membrane 123 and the second membrane 125 exhibit a different spatial orientation than a second straight line connecting the centers of the third membrane and the fourth membrane. For example, the first straight line may be perpendicular to the second straight line. In other words, different pairs of membranes may be arranged along different spatial axes.

Like the first and second membranes 123 and 125, the third membrane comprises a fifth main surface configured to receive sound waves from the reference gas 101 and a sixth main surface opposite to the fifth main surface. Accordingly, the fourth membrane comprises a seventh main surface configured to receive sound waves from the reference gas 101 and an eighth main surface opposite to the seventh main surface. The third membrane and the fourth membrane are oriented such that a third direction pointing from the fifth main surface to the sixth main surface is opposite to a fourth direction pointing from the seventh main surface to the eighth main surface.

Like the first and the second microphone signals 121 and 122, the third microphone signal and the fourth microphone signal may be used for mitigating signal components in the output signal related to mechanical vibrations of the photoacoustic gas sensor 100 in the direction of the spatial axis along which the third and the fourth membrane arranged. In some implementations, the circuit 130 may be further configured to generate the output signal 131 by destructively superimposing a fifth signal component of the third microphone signal related to the mechanical vibrations and a sixth signal component of the fourth microphone signal related to the mechanical vibrations.

Similarly, the circuit 130 may be further configured to generate the output signal 131 by constructively superimposing a seventh signal component of the third microphone signal related to the photoacoustic excitation of the reference gas 101 and an eighth signal component of the fourth microphone signal related to the photoacoustic excitation of the reference gas 101.

Like the first and the second membranes 123 and 125, the further membranes may be arranged in separate microphones or may be implemented in one semiconductor piece.

Since the photoacoustic gas sensor 100 comprises at least two membranes for sensing the photoacoustic excitation of the reference gas, the photoacoustic gas sensor 100 can be provided to be less susceptible to failure. To this end, the circuit 130 may be further configured to determine, based on the first microphone signal 121 and the second microphone signal 122, whether the first microphone signal 121 and the second microphone signal 122 are consistent. The circuit 130 may, e.g., compare the first microphone signal 121 and the second microphone signal 122 to each other and/or to a predetermined expected signal (e.g. from test measurements, simulations or a calibration). For example, if the microphone signals 121 and 122 deviate by a predetermined threshold, the circuit 130 may compare the microphone signal 121 and 122 to a predetermined expected signal. Accordingly, the circuit 130 may generate the output signal 131 based on only one of the first microphone signal 121 and the second microphone signal 122 if it is determined that the other one of the first microphone signal 121 and the second microphone signal 122 is not consistent to the one of the first microphone signal 121 and the second microphone signal 122.

Even if there is a problem with one of the microphone signals, the photoacoustic gas sensor 100 may still be able to function correctly and to obtain information about the amount of the energy transferred from the incoming light to the reference gas 101 via output signal 131 for the tradeoff of a reduced SNR of the output signal 131.

As described above, photoacoustic gas sensor 100 includes the light source 140 for emitting light towards the gas 104 and the housing 110. For example, the light source 140 may be configured to controllably emit light suitable for photoacoustically exciting the reference gas 101. The light source 140 is configured to emit light of one or more predefined wavelengths. For example, the light source 140 may be a selective emitter or a broadband emitter (e.g. a blackbody emitter or a thermal emitter). The light source 140 may, e.g., be a Light-Emitting Diode (LED) or a laser emitter. The light may, e.g., comprise infrared light (wavelength from 780 nm to 1 mm) and/or visible light (wavelength from 380 nm to 780 nm). The light may be periodically modulated light (e.g. electrically, mechanically or optically chopped light).

During a photoacoustic measurement time interval, the light source 140 is controlled to emit the light. Outside of the photoacoustic measurement time interval, the light source can be controlled to not emit light. The microphone signals 121 and 122 may then be used for determining information about the mechanical vibrations of the photoacoustic gas sensor 100. The circuit 130 may, e.g., be further configured to determine, based on the first microphone signal 121 and the second microphone signal 122, information indicative of the mechanical vibrations of the photoacoustic gas sensor 100. For example, by analyzing the first microphone signal 121 and the second microphone signal 122, information about at least one frequency of the mechanical vibrations as well as respective amplitudes may be obtained. The information indicative of the mechanical vibrations of the photoacoustic gas sensor 100 may be output by the photoacoustic gas sensor 100 (e.g. via output signal 131 or another signal).

Further, the information indicative of the mechanical vibrations of the photoacoustic gas sensor 100 may be used by the sensor for adjusting the light source 140. For example, the circuit 130 may be further configured to control the light source 140 to change a modulation frequency of the light if at least one frequency of the mechanical vibrations of the photoacoustic gas sensor 100 is in a predetermined frequency range. The predetermined frequency range may include one or more frequencies. For example, the predetermined frequency range may include the current modulation frequency of the light emitted by the light source 140. In order to reduce disturbances while measuring the photoacoustic excitation of the reference gas 101, the circuit 130 may, e.g., control the light source 140 to change the modulation frequency of the light, if the frequency of the mechanical vibrations of the photoacoustic gas sensor 100 is equal to or close to the modulation frequency of the light.

Although the circuit 130 is illustrated inside the housing 110 in FIG. 1, the circuit 130 may alternatively be arranged outside housing 110.

In the following, alternative arrangements of the first and second membranes and inside the housing are described with respect to FIGS. 3 and 4. In order to avoid lengthy repetitions, mainly the differences of the photoacoustic gas sensors illustrated in FIGS. 3 and 4 to photoacoustic gas sensor 100 are described in the following. It is to be noted that the above description of the elements of photoacoustic gas sensor 100 equally applies to the corresponding parts of the photoacoustic gas sensors illustrated in FIGS. 3 and 4.

Figure 3:
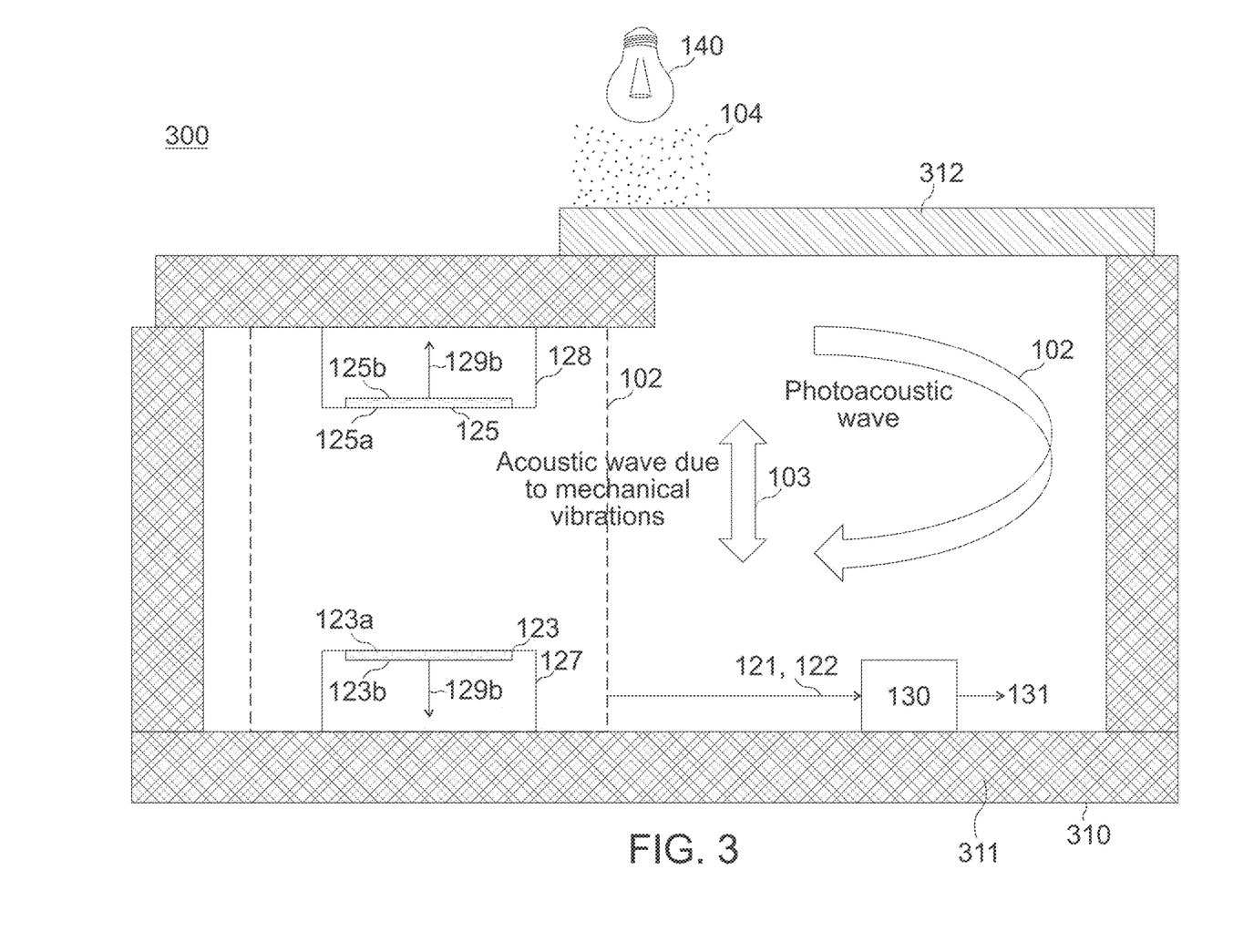
FIG. 3 illustrates a second example of a photoacoustic gas sensor.

FIG. 3 illustrates a photoacoustic gas sensor 300 comprising a hermetically sealed housing 310 with a housing body 311 and a housing lid 312. In contrast to housing body 111, housing body 311 is structured such that the two microphones 127 and 128 of microphone system 120 can be arranged along two opposite horizontal sections of housing body 311. Housing lid 312 is adapted accordingly. Therefore, the first membrane 123 is arranged below the second membrane 125 in vertical direction. The first membrane 123 and the second membrane 125 are substantially at the same horizontal position.

Again, the first direction 129a pointing from the first main surface 123a to the second main surface 123b of the first membrane 123 is opposite to the second direction 129b pointing from the third main surface 125a to the fourth main surface 125b of the second membrane 125. Distinguished from the implementations of FIGS. 1 and 2A-2C, the first and second membranes 123 and 125 are however arranged such that the first main surface 123a and the third main surface 125a face each other.

Figure 4:
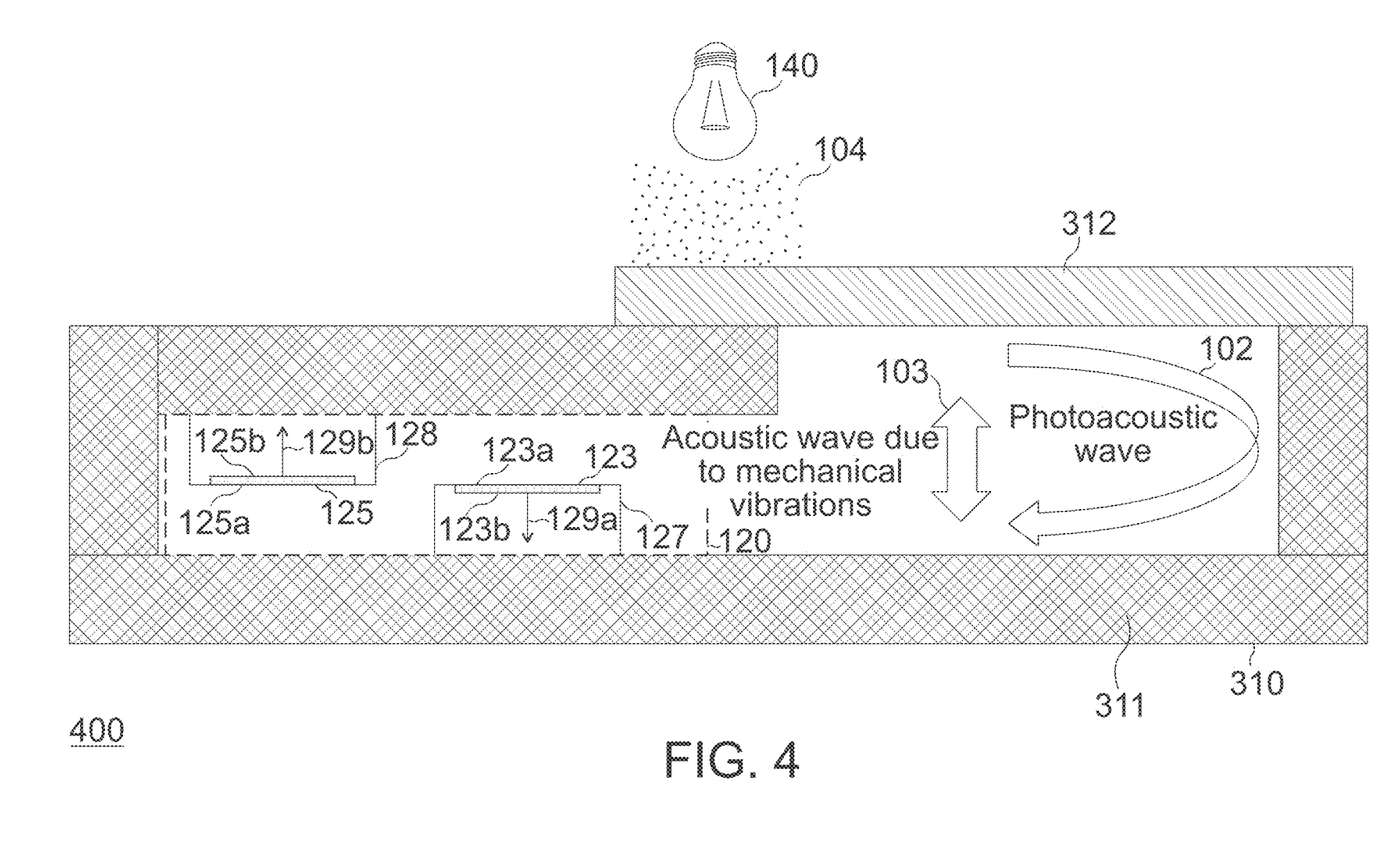
FIG. 4 illustrates a third example of a photoacoustic gas sensor.

FIG. 4 illustrates another photoacoustic gas sensor 400. Compared to the photoacoustic gas sensor 300, the first membrane 123 is horizontally displaced compared to second membrane 125. In some implementations, the first membrane 123 is also arranged below the second membrane 125 in vertical direction, but the first membrane 123 and the second membrane 125 are at different horizontal positions.

Again, the first direction 129a pointing from the first main surface 123a to the second main surface 123b of the first membrane 123 is opposite to the second direction 129b pointing from the third main surface 125a to the fourth main surface 125b of the second membrane 125. Accordingly, either the first membrane 123 and the second membrane 125 or the backplates of the microphones 127 and 128 face each other.

For the sake of clarity, the circuit 130 is not illustrated in FIG. 4.

Figure 5:
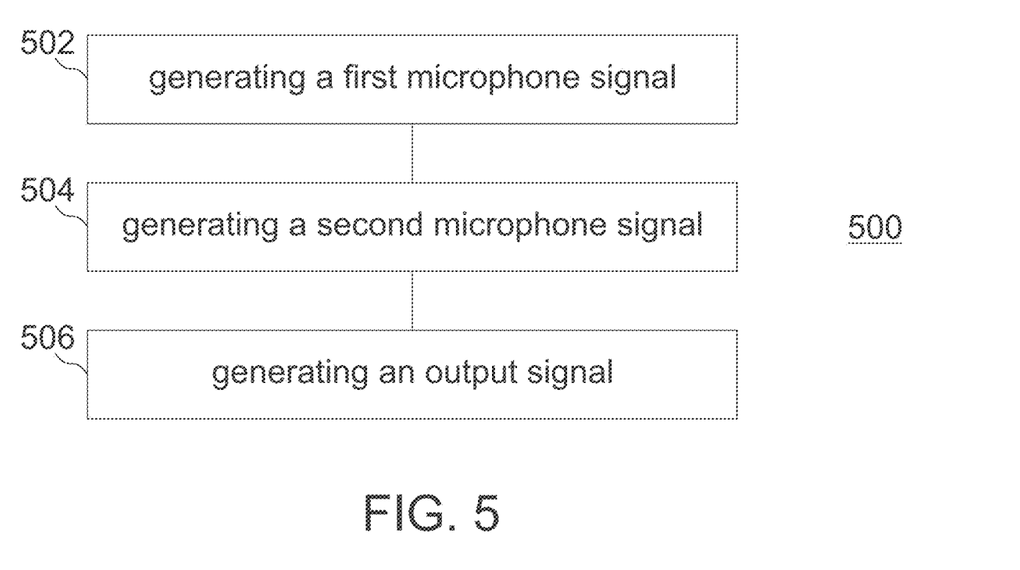
FIG. 5 illustrates a flowchart of an example of a method of operating a photoacoustic gas sensor.

For illustrating the operation of the photoacoustic gas sensor, FIG. 5 shows a flowchart of a method 500 of operating a photoacoustic gas sensor with a microphone system arranged inside a hermetically sealed housing. As described above, the housing is filled with a reference gas. Method 500 comprises generating 502 a first microphone signal using the microphone system. The first microphone signal comprises a first signal component related to a photoacoustic excitation of the reference gas. Further, method 500 comprises generating 504 a second microphone signal using the microphone system. The second microphone signal comprises a second signal component related to the photoacoustic excitation. Additionally, method 500 comprises generating 506 an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

More details and aspects of method 500 are explained in connection with the proposed concept or one or more example implementations described above (e.g. FIGS. 1 to 4). The method may comprise one or more additional optional features corresponding to one or more aspects of the proposed concept or one or more examples described above.

The examples as described herein may be summarized as follows:

Some examples relate to a photoacoustic gas sensor. The photoacoustic gas sensor comprises a hermetically sealed housing filled with a reference gas. Further, the photoacoustic gas sensor comprises a microphone system arranged inside the housing. The microphone system is configured to generate a first microphone signal comprising a first signal component related to a photoacoustic excitation of the reference gas and a second microphone signal comprising a second signal component related to the photoacoustic excitation. The photoacoustic gas sensor additionally comprises a circuit configured to generate an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

In some examples, the microphone system is arranged such that the mechanical vibrations of the photoacoustic gas sensor result in opposite signal polarities of the third signal component and the fourth signal component.

According to some examples, the circuit is configured to generate the output signal by constructively superimposing the first signal component and the second signal component.

In some examples, the microphone system is configured to generate the first microphone signal based on a relative movement of a first membrane with respect to a first backplate.

Further, the microphone system is configured to generate the second microphone signal based on a relative movement of a second membrane with respect to a second backplate.

According to some examples, either the first membrane and the second membrane or the first backplate and the second backplate face each other.

In some examples, the microphone system comprises a first microphone comprising the first membrane and a second microphone comprising the second membrane. Alternatively, the microphone system is a microphone implemented in one semiconductor piece and comprises the first membrane and the second membrane.

According to some examples, a distance between the first membrane and the second membrane is less than two times a diameter of one of the first membrane and the second membrane.

In some examples, the microphone system is further configured to generate a third microphone signal based on a relative movement of a third membrane with respect to a third backplate. Additionally, the microphone system is configured to generate a fourth microphone signal based on a relative movement of a fourth membrane with respect to a fourth backplate. The first to fourth membranes are oriented such that a first virtual straight line connecting the centers of the first membrane and the second membrane exhibit a different spatial orientation than a second straight line connecting the centers of the third membrane and the fourth membrane.

According to some examples, the first straight line is perpendicular to the second straight line.

In some examples, the circuit is configured to generate the output signal by destructively superimposing a fifth signal component of the third microphone signal related to the mechanical vibrations and a sixth signal component of the fourth microphone signal related to the mechanical vibrations.

According to some examples, the circuit is further configured to determine, based on the first microphone signal and the second microphone signal, whether the first microphone signal and the second microphone signal are consistent. Additionally, the circuit is configured to generate the output signal based on only one of the first microphone signal and the second microphone signal if it is determined that the other one of the first microphone signal and the second microphone signal is not consistent to the one of the first microphone signal and the second microphone signal.

In some examples, the photoacoustic gas sensor further comprises a light source configured to controllably emit light suitable for photoacoustically exciting the reference gas. When the light source is controlled to not emit light, the circuit is further configured to determine, based on the first microphone signal and the second microphone signal, information indicative of the mechanical vibrations of the photoacoustic gas sensor.

According to some examples, the information indicative of the mechanical vibrations of the photoacoustic gas sensor comprises information about at least one frequency of the mechanical vibrations.

In some examples, the circuit is further configured to control the light source to change a modulation frequency of the light if the least one frequency of the mechanical vibrations is in a predetermined frequency range.

Further examples relate to a method of operating a photoacoustic gas sensor comprising a microphone system arranged inside a hermetically sealed housing. The housing is filled with a reference gas. The method comprises generating a first microphone signal using the microphone system. The first microphone signal comprises a first signal component related to a photoacoustic excitation of the reference gas. Further, the method comprises generating a second microphone signal using the microphone system. The second microphone signal comprises a second signal component related to the photoacoustic excitation. Additionally, the method comprises generating an output signal based on the first microphone signal and the second microphone signal by destructively superimposing a third signal component of the first microphone signal related to mechanical vibrations of the photoacoustic gas sensor and a fourth signal component of the second microphone signal related to the mechanical vibrations.

Some example relate to another photoacoustic gas sensor. The photoacoustic gas sensor comprises a hermetically sealed housing filled with a reference gas. Further, the photoacoustic gas sensor comprises a first membrane arranged inside the housing and a second membrane arranged inside the housing. The first membrane comprises a first main surface configured to receive sound waves from the reference gas and a second main surface opposite to the first main surface. The second membrane comprises a third main surface configured to receive sound waves from the reference gas and a fourth main surface opposite to the third main surface. The first membrane and the second membrane are oriented such that a first direction pointing from the first main surface to the second main surface is opposite to a second direction pointing from the third main surface to the fourth main surface.

According to some examples, a distance between the first membrane and the second membrane is less than two times a diameter of one of the first membrane and the second membrane.

In some examples, the photoacoustic gas sensor further comprises a third membrane arranged inside the housing and a fourth membrane arranged inside the housing. The first to fourth membranes are oriented such that a first virtual straight line connecting the centers of the first membrane and the second membrane exhibit a different spatial orientation than a second straight line connecting the centers of the third membrane and the fourth membrane.

According to some examples, the third membrane comprises a fifth main surface configured to receive sound waves from the reference gas and a sixth main surface opposite to the fifth main surface. The fourth membrane comprises a seventh main surface configured to receive sound waves from the reference gas and an eighth main surface opposite to the seventh main surface. The third membrane and the fourth membrane are oriented such that a third direction pointing from the fifth main surface to the sixth main surface is opposite to a fourth direction pointing from the seventh main surface to the eighth main surface.

The proposed photoacoustic gas sensors and the proposed method of operating a photoacoustic gas sensor may provide immunity to background perturbations like vibrations, noise, changing in ambient temperature, humidity or barometric pressure. By bringing, e.g., two microphones close together, a high level of miniaturization may be achieved while keeping the same acoustic performance for both microphones to catch and eliminate the mechanical vibrations. As a consequence, the proposed photoacoustic gas sensors may allow smaller form factors compared to conventional sensors. The proposed sensors comprising a sealed acoustic chamber cavity and two microphones for noise cancelation may provide high immunity to the environment. The small and sealed acoustic cavity made of, e.g., ceramic or metal material and comprising, e.g., an infrared window or band pass filter may attenuate acoustic background noise. The stacked microphones sense the active photoacoustic signal and may cancel the mechanical vibrations effect. The superposition of two microphones packaged in a single sealed package may allow to solve issues arising from acoustic and vibration excitation. Accordingly, photoacoustic gas sensors having high immunity to mechanical vibrations may be provided. Further, providing two microphones to the system may increase safety since basic functionality may be provided even if one of the microphone stops working.

The proposed photoacoustic gas sensors may allow to overcome the affection of gas sensors by mechanical vibrations in applications like automotive, HVAC (Heating, Ventilation and Air Conditioning) or ventilation systems based on a motor.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A photoacoustic gas sensor, comprising:
a hermetically sealed housing filled with a reference gas;
a microphone system arranged inside the housing,
wherein the microphone system is configured to generate a first microphone signal and a second microphone signal,
wherein the first microphone signal comprises a first signal component, related to a photoacoustic excitation of the reference gas, and a third signal component related to mechanical vibrations of the photoacoustic gas sensor, and
wherein the second microphone signal comprises a second signal component, related to the photoacoustic excitation, and a fourth signal component related to the mechanical vibrations of the photoacoustic gas sensor; and
a circuit configured to generate an output signal based on the first microphone signal and the second microphone signal by destructively superimposing the third signal component and the fourth signal component.

2. The photoacoustic gas sensor of claim 1, wherein the microphone system is arranged such that the mechanical vibrations of the photoacoustic gas sensor result in opposite signal polarities of the third signal component and the fourth signal component.

3. The photoacoustic gas sensor of claim 1, wherein the circuit is configured to generate the output signal by constructively superimposing the first signal component and the second signal component.

4. The photoacoustic gas sensor of claim 1, wherein the microphone system is configured to:

generate the first microphone signal based on a relative movement of a first membrane with respect to a first backplate; and generate the second microphone signal based on a relative movement of a second membrane with respect to a second backplate.

5. The photoacoustic gas sensor of claim 4, wherein either the first membrane and the second membrane or the first backplate and the second backplate face each other.

6. The photoacoustic gas sensor of claim 4, wherein the microphone system comprises a first microphone, comprising the first membrane, and a second microphone comprising the second membrane.

7. The photoacoustic gas sensor of claim 4, wherein the microphone system is a microphone implemented in one semiconductor piece and comprises the first membrane and the second membrane.

8. The photoacoustic gas sensor of claim 4, wherein a distance between the first membrane and the second membrane is less than two times a diameter of one of the first membrane or the second membrane.

9. The photoacoustic gas sensor of claim 4, wherein the microphone system is further configured to:

generate a third microphone signal based on a relative movement of a third membrane with respect to a third backplate; and generate a fourth microphone signal based on a relative movement of a fourth membrane with respect to a fourth backplate, wherein the first membrane, the second membrane, the third membrane, and the fourth membrane are oriented such that a first virtual straight line connecting centers of the first membrane and the second membrane, exhibit a different spatial orientation than a second virtual straight line connecting centers of the third membrane and the fourth membrane.

10. The photoacoustic gas sensor of claim 9, wherein the first virtual straight line is perpendicular to the second virtual straight line.

11. The photoacoustic gas sensor of claim 9, wherein the circuit is configured to generate the output signal by destructively superimposing a fifth signal component, of the third microphone signal and relating to the mechanical vibrations, and a sixth signal component of the fourth microphone signal and relating to the mechanical vibrations.

12. The photoacoustic gas sensor of claim 1, wherein the circuit is further configured to:

determine, based on the first microphone signal and the second microphone signal, whether the first microphone signal and the second microphone signal are consistent; and generate the output signal, based on only one of the first microphone signal or the second microphone signal, if it is determined that the other one of the first microphone signal or the second microphone signal is not consistent with the one of the first microphone signal or the second microphone signal.

13. The photoacoustic gas sensor of claim 1, wherein the photoacoustic gas sensor further comprises a light source configured to controllably emit light suitable for photoacoustically exciting the reference gas, and wherein, when the light source is controlled to not emit light, the circuit is further configured to determine, based on the first microphone signal and the second microphone signal, information indicative of the mechanical vibrations of the photoacoustic gas sensor.

14. The photoacoustic gas sensor of claim 13, wherein the information indicative of the mechanical vibrations of the photoacoustic gas sensor comprises information about at least one frequency of the mechanical vibrations.

15. The photoacoustic gas sensor of claim 14, wherein the circuit is further configured to control the light source to change a modulation frequency of the light if the at least one frequency of the mechanical vibrations is in a predetermined frequency range.

16. A method of operating a photoacoustic gas sensor comprising a microphone system arranged inside a hermetically sealed housing, wherein the housing is filled with a reference gas, the method comprising:

generating a first microphone signal using the microphone system, wherein the first microphone signal comprises a first signal component, related to a photoacoustic excitation of the reference gas, and a third signal component related to mechanical vibrations of the photoacoustic gas sensor;

generating a second microphone signal using the microphone system, wherein the second microphone signal comprises a second signal component, related to the photoacoustic excitation, and a fourth signal component related to the mechanical vibrations of the photoacoustic gas sensor; and generating an output signal based on the first microphone signal and the second microphone signal by destructively superimposing the third signal component and the fourth signal component.

17. A photoacoustic gas sensor, comprising:
a hermetically sealed housing filled with a reference gas;
a first membrane arranged inside the housing; and
a second membrane arranged inside the housing, wherein the first membrane comprises a first main surface configured to receive sound waves from the reference gas and a second main surface opposite to the first main surface, wherein the second membrane comprises a third main surface configured to receive the sound waves and a fourth main surface opposite to the third main surface, wherein the second main surface and the fourth main surface are not subject to the reference gas, and wherein the first membrane and the second membrane are oriented such that a first direction pointing from the first main surface to the second main surface is opposite to a second direction pointing from the third main surface to the fourth main surface.

18. The photoacoustic gas sensor of claim 17, wherein a distance between the first membrane and the second membrane is less than two times a diameter of one of the first membrane or the second membrane.

19. The photoacoustic gas sensor of claim 17, further comprising:

a third membrane arranged inside the housing; and
a fourth membrane arranged inside the housing, wherein the first membrane, the second membrane, the third membrane, and the fourth membrane are oriented such that a first virtual straight line, connecting centers of the first membrane and the second membrane, exhibit a different spatial orientation than a second virtual straight line connecting centers of the third membrane and the fourth membrane.

20. The photoacoustic gas sensor of claim 19, wherein the third membrane comprises a fifth main surface configured to receive sound waves from the reference gas and a sixth main surface opposite to the fifth main surface,
   wherein the fourth membrane comprises a seventh main surface configured to receive the sound waves from the reference gas and an eighth main surface opposite to the seventh main surface, and
   wherein the third membrane and the fourth membrane are oriented such that a third direction pointing from the fifth main surface to the sixth main surface is opposite to a fourth direction pointing from the seventh main surface to the eighth main surface.

* * * * *